(12) United States Patent
Zhai et al.

(10) Patent No.: US 7,940,662 B2
(45) Date of Patent: May 10, 2011

(54) METHOD AND APPARATUS FOR FORWARDING BURSTY DATA

(75) Inventors: Shubing Zhai, Shanghai (CN); Yefei Sun, Shanghai (CN); Xiaoqian Zhang, Shanghai (CN); Zhonghai Gan, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 1428 days.

(21) Appl. No.: 10/861,897

(22) Filed: Jun. 4, 2004

(65) Prior Publication Data

US 2005/0226243 A1 Oct. 13, 2005

Related U.S. Application Data

(60) Provisional application No. 60/561,774, filed on Apr. 12, 2004.

(51) Int. Cl.
*H04L 12/26* (2006.01)
(52) U.S. Cl. ......... 370/235; 370/242; 370/413; 370/429
(58) Field of Classification Search ............... 370/230, 370/360, 389; 398/48, 60, 69
See application file for complete search history.

(56) References Cited

U.S. PATENT DOCUMENTS

| | | | |
|---|---|---|---|
| 5,528,584 A * | 6/1996 | Grant et al. | 370/254 |
| 6,591,316 B1 | 7/2003 | Roman et al. | |
| 6,963,564 B1 * | 11/2005 | Liu | 370/389 |
| 7,215,666 B1 * | 5/2007 | Beshai et al. | 370/380 |
| 7,343,388 B1 * | 3/2008 | Burney et al. | 708/209 |
| 7,391,786 B1 * | 6/2008 | Prasad et al. | 370/412 |
| 2003/0043828 A1 | 3/2003 | Wang et al. | |
| 2003/0117958 A1 | 6/2003 | Nation et al. | |
| 2003/0128703 A1 * | 7/2003 | Zhao et al. | 370/392 |
| 2004/0037302 A1 | 2/2004 | Varma et al. | |

* cited by examiner

*Primary Examiner* — Seema S Rao
*Assistant Examiner* — Wanda Z Russell
(74) *Attorney, Agent, or Firm* — Heimlich Law, PC; Alan Heimlich, Esq.

(57) ABSTRACT

Data received from a bursty interface is received on a burst-by-burst basis. Once a burst is received, it is stored in a processing queue. A complete burst is received so long a processing queue can accommodate a data burst. The complete data burst is directed to an output and used to create a complete data burst on said output. The output burst is dispatched so long as a receiving port is able to accept the output burst.

38 Claims, 14 Drawing Sheets

METHOD AND APPARATUS FOR FORWARDING BURSTY DATA

RELATED APPLICATIONS

This present application is related to a provisional application Ser. No. 60/561,774 filed on Apr. 12, 2004, entitled "Method And Apparatus For Forwarding Bursty Data", by Zhai Shu Bing, et al. currently pending, for which the priority date for this application is hereby claimed.

BACKGROUND

A wide variety of electronic communication systems utilize an interface known as a "bursty interface". A bursty interface is an interface that is generally capable of sending or receiving some amount of data on a periodic basis. During a first interval in such a period, data is usually sent or received at a high data rate. During a second interval within the same period, the interface is generally quiescent, i.e. the interface is not sending or receiving data during this second interval.

Bursty interfaces are commonly used because of the bursty nature of data communicated from one system to another. Bursty interfaces are also commonly used as a mechanism for decoupling the physical sampling of data between two systems that are communicatively coupled to each other. In digital systems, for example, two independent systems are generally operated using two independent clocks. A bursty interface is a practical means to enable the transfer of data between two separately clocked systems because a bursty interface generally provides an elasticity buffering capability.

In the past, a bursty interface was generally designed around a linear memory known as a "first-in-first-out" (FIFO) memory. A FIFO memory generally provides an input port and an output port. In many implementations, the input port and the output port can be independently clocked. For example, an independent clocking mechanism is generally provided for a FIFO input port. Using this independent clocking mechanism, data can be stored in the FIFO memory without regard to any clocking mechanism used to retrieve data from the FIFO. It generally follows that a FIFO memory provides a separate and independent clocking mechanism for data retrieval. The retrieval clocking mechanism can be used without regard to the clock mechanism used to store data in the FIFO memory. This type of structure can be used to support a simplistic mechanism for decoupling the clock signals of two independent data systems.

In a bursty interface, the input port of a FIFO has traditionally been used to receive data during a first interval by means of an input clocking mechanism. The output port of the FIFO can then be used to retrieve data using an independent retrieval clocking mechanism. The retrieval clocking mechanism is also generally used as a basis for manipulating data within the system receiving bursty data. As such, the retrieval clocking mechanism can be considered the operating clock that synchronizes the internal operation of the system receiving such bursty data. Data can then be retrieved from the output port of the FIFO at some convenient rate commensurate with the operation of the system receiving the bursty data. Bursty data can then be stored in the FIFO as it arrives at an independent rate from another system.

Modern computer networking systems are also employing bursty interface structures. For example, one common computer networking system known as System Packet Interface (SPI) comprises a specific implementation of a bursty interface that can be used to transfer data packets from one system element to another. The SPI interface has been defined at various levels (e.g. SPI-3 and SPI-4). SPI-3 and SPI-4 define various aspects of the System Packet Interface including but not limited to transfer speed, packet sizing and burst sizing. One interesting characteristic in any bursty interface used to carry data packets is that of packet alignment to a data burst. For example, the data burst may be used to carry a complete single packet, a portion of a single packet, a complete single packet and a portion of a second packet, two or more complete data packets and portions of two or more data packets. Alignment of a data packet to a data burst is a common issue irrespective of the type of bursty interface used to communicate a data packet from one system to another.

Although a FIFO is a useful building block in the design and implementation of a bursty interface, there are several problems that surface when a bursty interface is used to convey a data packet. One specific problem is that of flow control. When a bursty interface is based on a FIFO, flow control is generally designed to reflect the availability of memory within the FIFO. For example, when a FIFO is filled to a certain capacity, the FIFO may not be able to reliably receive an entire burst of data. Accordingly, a system that is delivering bursty data to a receiving system is directed to hold additional data transfers until the receiving system can retrieve some of the data stored in the FIFO. As the receiving system retrieves data stored in the FIFO, the hold directive can be suspended once the FIFO can again reliably accommodate an additional burst of data. Although such flow control can be used to manage a FIFO-based bursty interface, it is simply not suitable when the data carried by a data burst is packetized. This is because a hold directive can be issued during a data burst, preventing the reception of an entire data burst within a given period of time. If the FIFO cannot reliably accommodate an entire data burst, a receiving system may not be able to properly process a data packet if the data packet is only partially received by the FIFO. This is especially problematic in the event that a data packet needs to be forwarded to another system using a second bursty interface.

SUMMARY

Herein disclosed are a method and apparatus for forwarding bursty data. According to one embodiment, bursty data is forwarded by first receiving a complete burst of data. The complete burst of data is then directed to a processing queue. When an output port is able to accept data for a particular logical port, a complete burst of data is forwarded from the processing queue to the output port.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Bursty interfaces are often used to receive packetized data. One example of a packetized data interface is the System Packet Interface (SPI). The SPI interface is primarily defined in two documents including:

SPI-3 (OC-48 System Packet Interface) OIF-SPI3-01.0-SPI-3 Packet Interface for Physical and Link Layers for OC-48. OIF June 2000; and SPI-4 phase 2 (OC-192 System Packet Interface) OIF-SPI4-02.0-System Packet Interface Level 4 (SPI-4) Phase 2: OC-192 System Interface for Physical and Link Layer Devices. OIF January 2001.

Although the present method and apparatus can be used to process packetized data bursts that conform to the SPI specification, the claims appended hereto are not intended to be limited in scope to such applications and can be applied in any application where bursty data from one system is received in another system.

Figure 1:
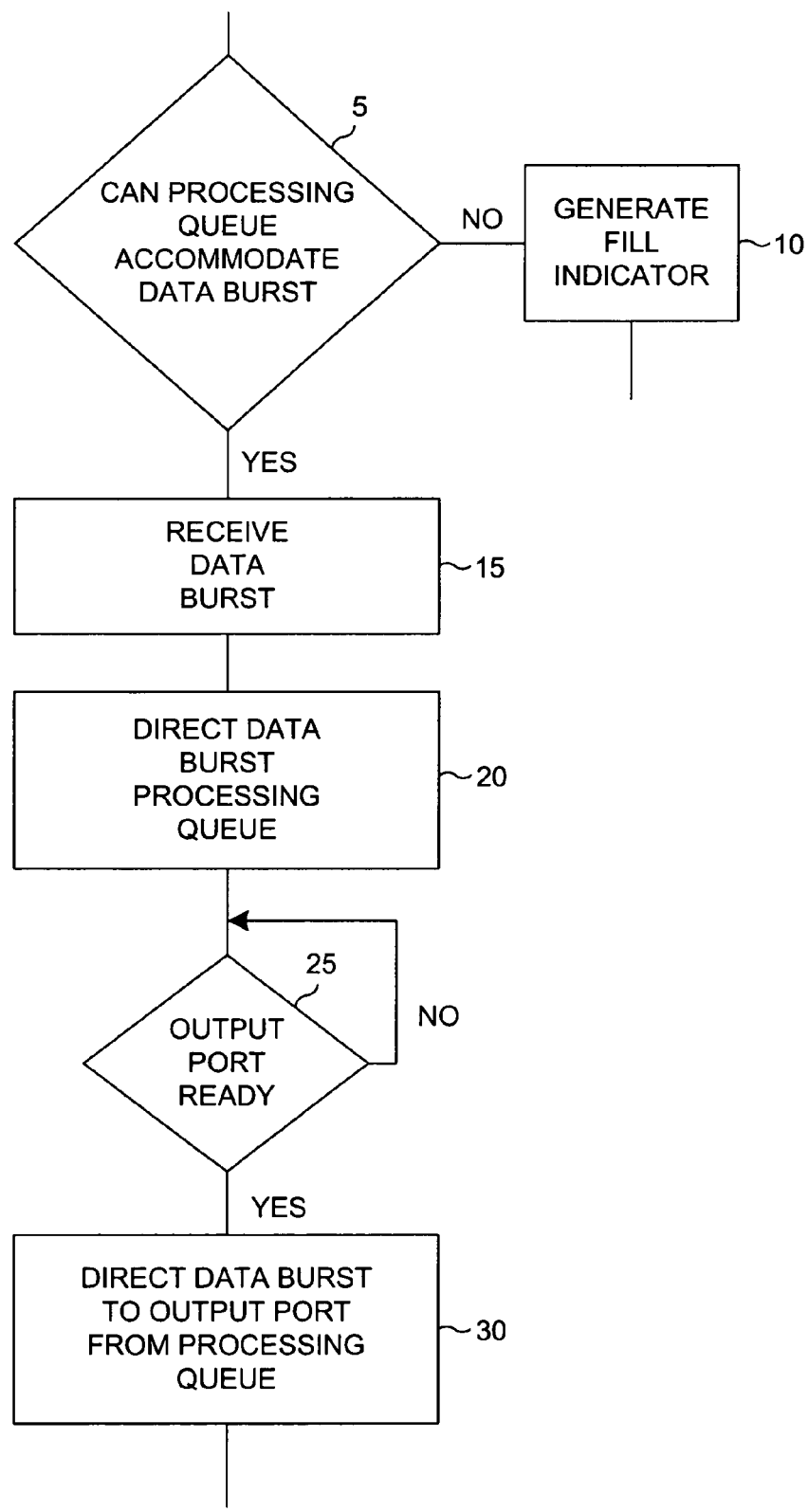
FIG. 1 is a flow diagram that depicts one example method for forwarding bursty data.

FIG. 1 is a flow diagram that depicts one example method for forwarding bursty data. According to this example method, bursty data is forwarded by first receiving a complete data burst (step 15) and then directing the complete burst of data to a processing queue (step 20). When an output port is ready to receive bursty data (step 25), the complete burst of data is forwarded from the processing queue to the output port (step 30). According to one illustrative variation of the present method, a fill indicator is generated (step 10) when a processing queue cannot accommodate a complete data burst (step 5). Hence, so long as a processing queue is available, a complete data burst can be received.

Figure 2:
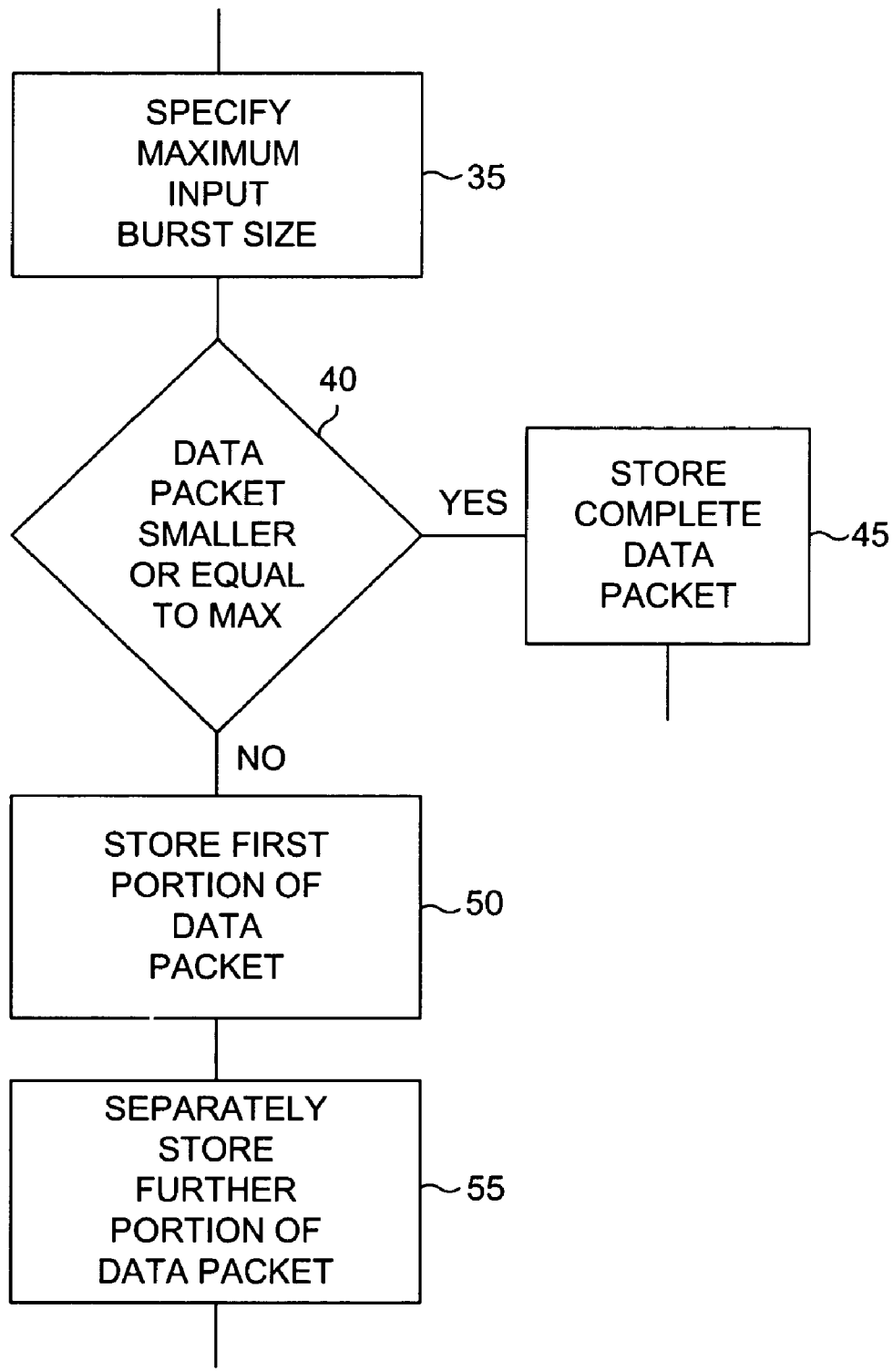
FIG. 2 is a flow diagram that depicts one example method for receiving a complete burst of data.

FIG. 2 is a flow diagram that depicts one example method for receiving a complete burst of data. According to this example method, a maximum input burst size is specified (step 35). By specifying a maximum input burst size, a minimum amount of storage is allocated for receiving a complete data burst. For example, in one alternative method which is suitable for use in receiving data bursts commensurate with the SPI-3 specification, a maximum input burst size may be defined as 128 bytes. In one illustrative use case, the present method can be applied when receiving SPI-4 data bursts comprising {INVENTOR SPECIFY TYPICAL SIZE OF SPI-4 DATA BURST}. These are merely illustrative examples of a burst size applicable to a particular type of packetized bursty interface and the claims appended hereto are not intended to be limited in scope by this illustrative example.

According to one variation of this method, a data packet that is smaller than or equal to (step 40) the maximum input burst size is completely stored (step 45) in a previously allocated amount of storage. When a data packet that is larger than the maximum input burst size is received (step 40), a first portion of the data packet is stored (step 50), e.g. in a first previously allocated amount of storage. A further portion of the data packet is separately stored (step 55), e.g. in a second previously allocated amount of storage. According to one variation of this illustrative method, the amount of storage allocated is determined according to the maximum input burst size.

Figure 3:
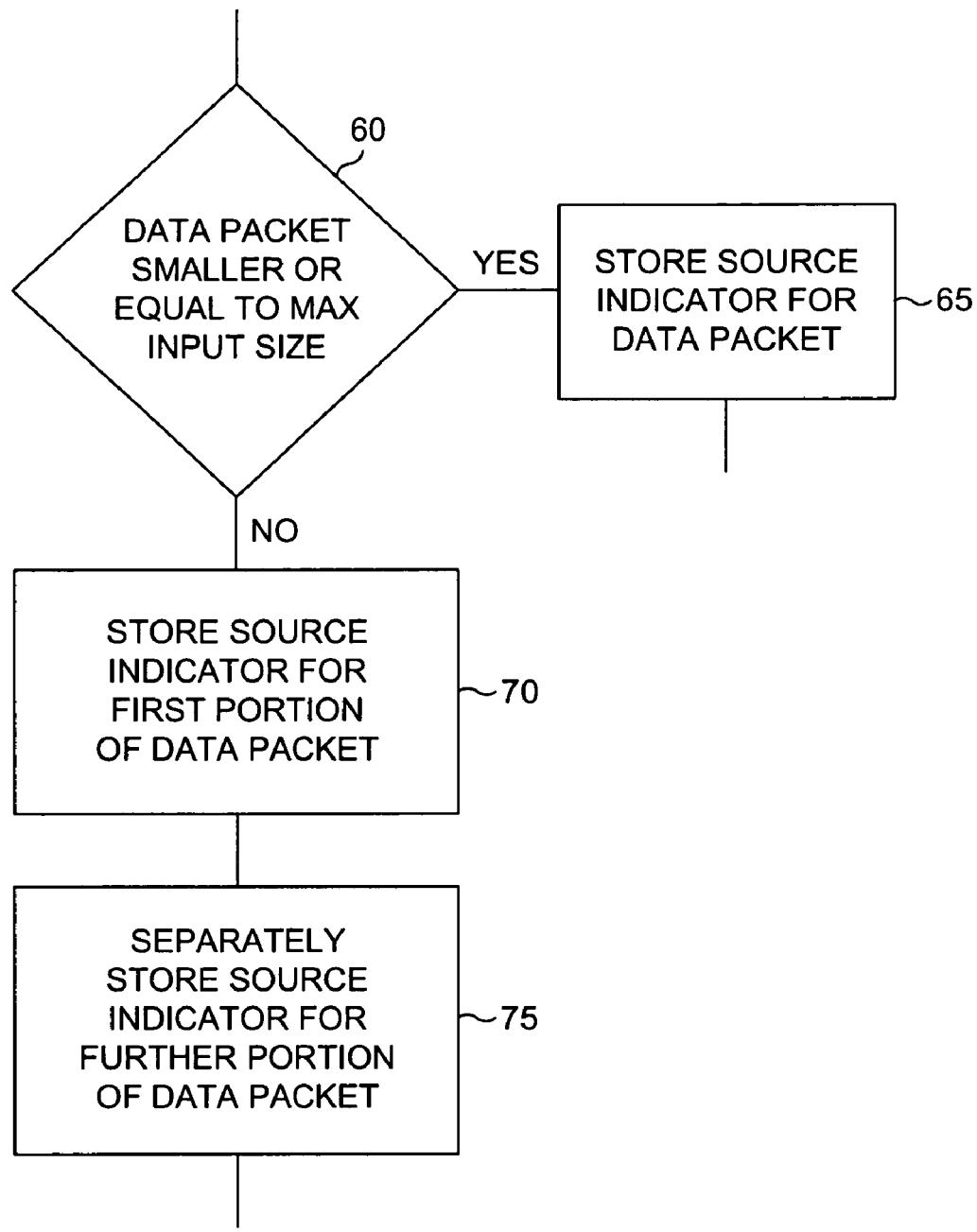
FIG. 3 is a flow diagram that depicts one alternative method for receiving a complete burst of data.

FIG. 3 is a flow diagram that depicts one alternative method for receiving a complete burst of data. According to this alternative method, a complete burst of data is received by further storing a source indicator for a data packet (step 65) when the data packet is smaller or equal to the maximum input burst size (step 60). In the event that a received data packet is larger than the maximum input burst size (step 60), a source indicator for a first portion of the data packet is stored (step 70), e.g. in a first previously allocated amount of storage. A source indicator for a further portion of the data packet is stored separately (step 75), e.g. in a second previously allocated amount of storage. In this alternative method, the first previously allocated amount of storage is specified according to the maximum input burst size with an additional amount of storage provided for accommodating a source indicator associatively with a data packet.

Figure 4:
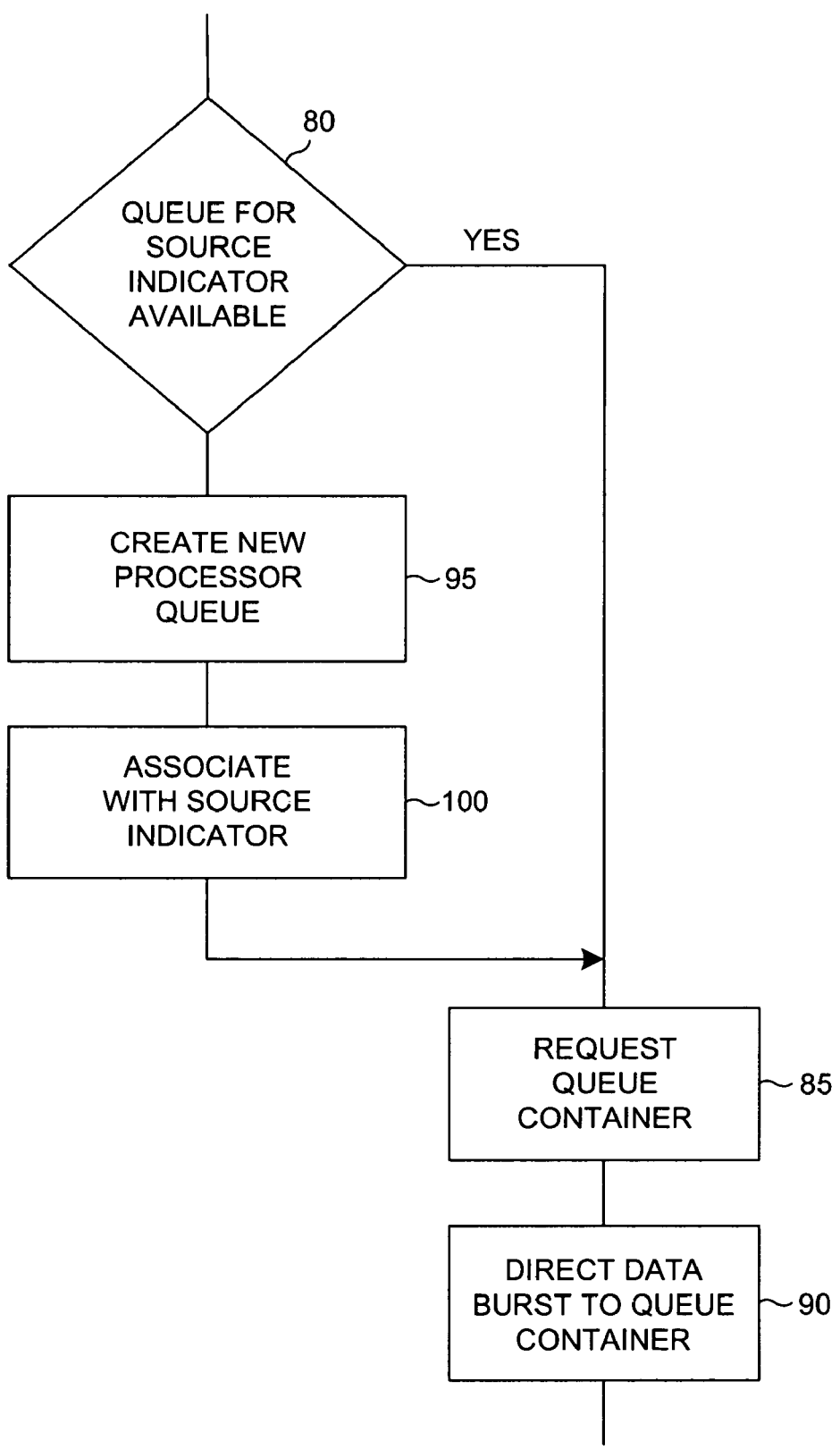
FIG. 4 is a flow diagram that illustrates one example method for directing a complete burst of data to a processing queue.

FIG. 4 is a flow diagram that illustrates one example method for directing a complete burst of data to a processing queue. According to this example method, a processing queue is identified according to a source indicator. When a processing queue is available for a particular source indicator (step 80), directing a complete burst of data to a processing queue is accomplished by requesting a queue container (step 85) and then directing the complete data burst to the queue container (step 90). When a processing queue is not available for particular source indicator (step 80), a new processing queue must be requested. According to one illustrative variation of the present method, a new processing queue is created (step 95) in response to the request for a new processing queue. The new processing queue is then associated with the source indicator (step 100) for which a processing queue could not previously be identified.

Figure 5:
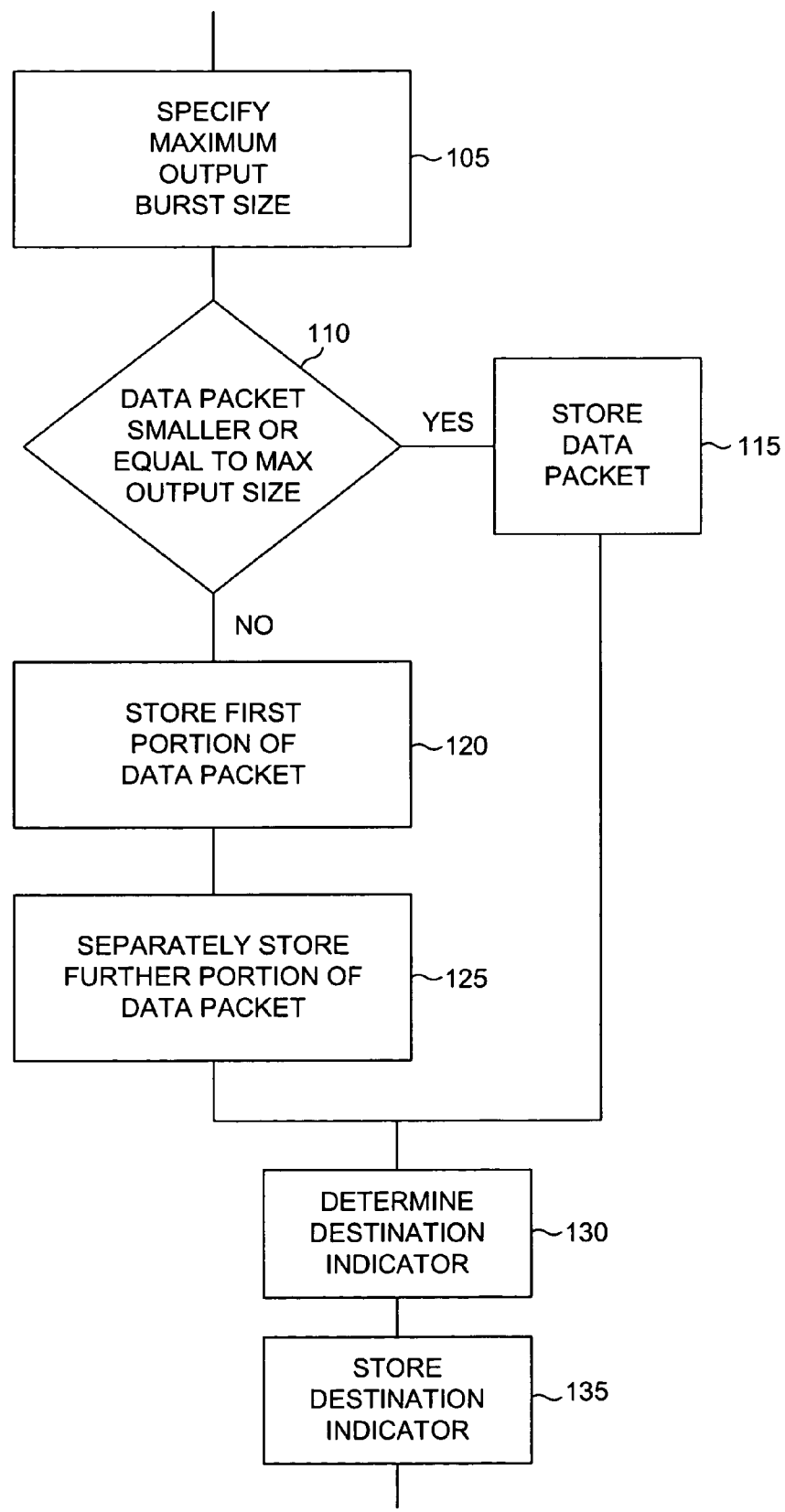
FIG. 5 is a flow diagram that depicts one example method for directing a complete burst of data to an output port.

FIG. 5 is a flow diagram that depicts one example method for directing a complete burst of data to an output port. According to this example method, a complete burst of data is directed from a processing queue to an output port according to a specified maximum output burst size (step 105). When a data packet is smaller than or equal to the maximum output burst size (step 110), the complete data packet is stored (step 115), e.g. in a previously allocated amount of storage. Otherwise, a first portion of the data packet is stored (step 120) and a further portion of the data packet is stored separately (step 125). According to one alternative method, the first portion of the data packet is stored in a first previously allocated amount of storage and the further portion of the data packet is stored in a second previously allocated amount of storage. The amount of storage allocated in each case is allocated in accordance with the previously specified maximum output burst size.

In furtherance of directing a complete burst of data to an output port, a destination indicator is determined for a data packet (step 130). The destination indicator is then stored along with the data packet (step 135). According to one alternative method, the amount of storage allocated to accommodate the data packet is allocated according to the previously specified maximum output burst size and an additional amount of storage is allocated to support storage of the destination indicator.

Figure 6:
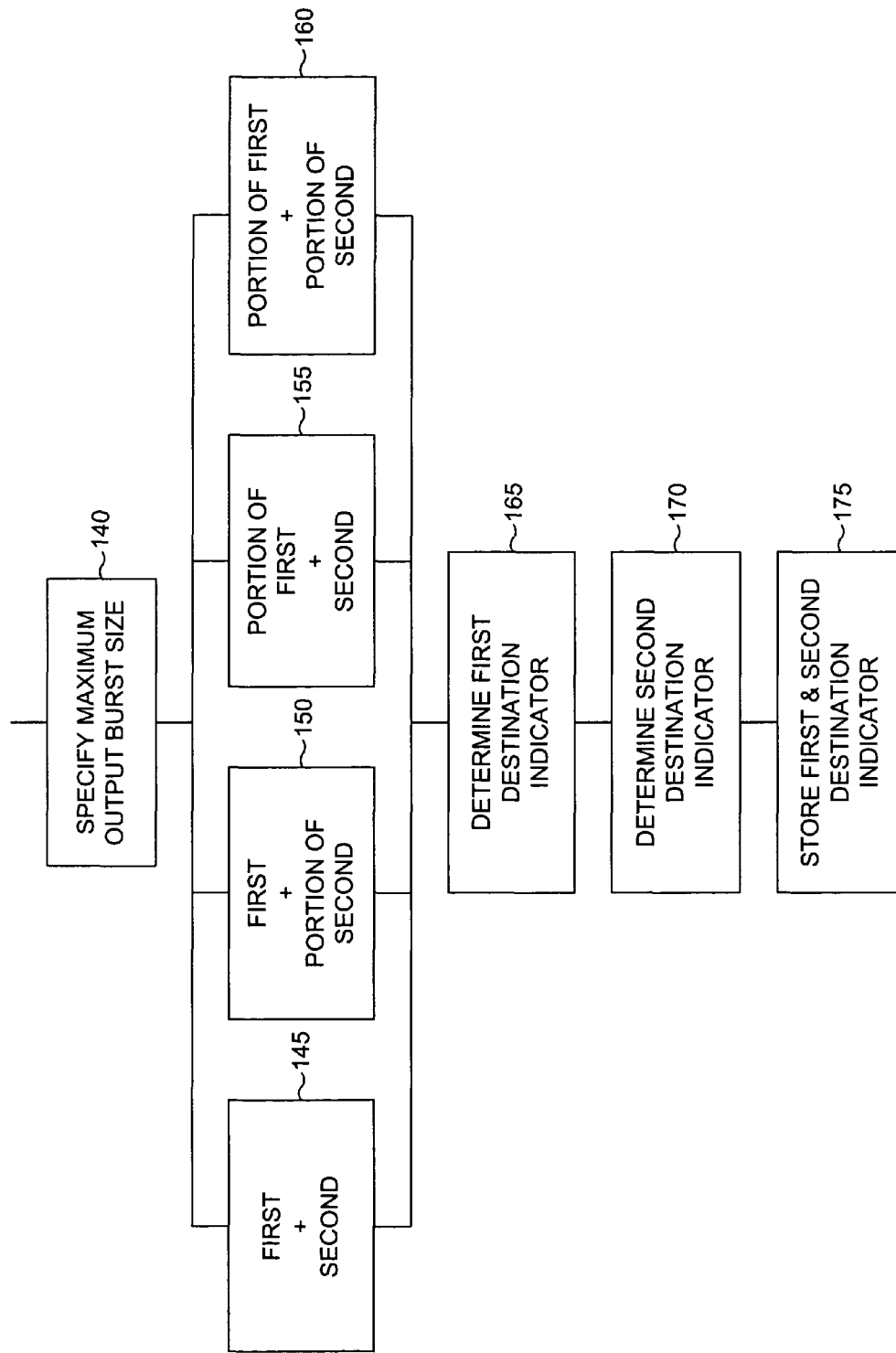
FIG. 6 is a flow diagram that depicts one illustrative alternative method for directing a complete data bursts to an output port.

FIG. 6 is a flow diagram that depicts one illustrative alternative method for directing a complete data bursts to an output port. According to this alternative method, a maximum output burst size is specified (step 140). One or more processing queues can be used as the source an output burst constructed commensurate with the maximum output burst size. As such, one or more complete data bursts stored in one or more processing queues can be combined to form a single output burst according to this alternative method. The number of complete data bursts that can be combined to form a single output burst is determined according to the specified maximum output burst size and each complete data burst retrieved from the one or more processing queues.

According to one example variation of this alternative method, a first and a second data packet (step 145) are retrieved from one or more processing queues and stored collectively to form an output burst that is less than or equal to the maximum output burst size. In yet another variation of this alternative method, a first data packet and a portion of a second data packet (step 150) are retrieved from one or more processing queues and stored collectively to form an output burst that is less than or equal to the maximum output burst size. A portion of a first data packet and a complete second data packet (step 155), according to yet another variation of this alternative method, are retrieved from one or more processing queues to form an output burst that is less than or equal to the maximum output burst size. According to yet another variation of this alternative method, a portion of a first data packet and a portion of a second data packet (step 160) are retrieved from one or more processing queues to form an output burst that is less than or equal to the maximum output burst size.

According to this alternative method, a complete burst of data is forwarded to an output by further determining a first destination indicator (step 165) and a second destination indicator (step 170). The first destination indicator is determined according to at least one of a first data packet and a portion of a first data packet. The second destination indicator is determined according to at least one of a second data packet and a portion of a second data packet. The first and second destination indicators are then stored (step 175), e.g. by storing said first and second destination indicators collectively with a complete output burst formed in accordance with the teachings described herein.

Figure 7:
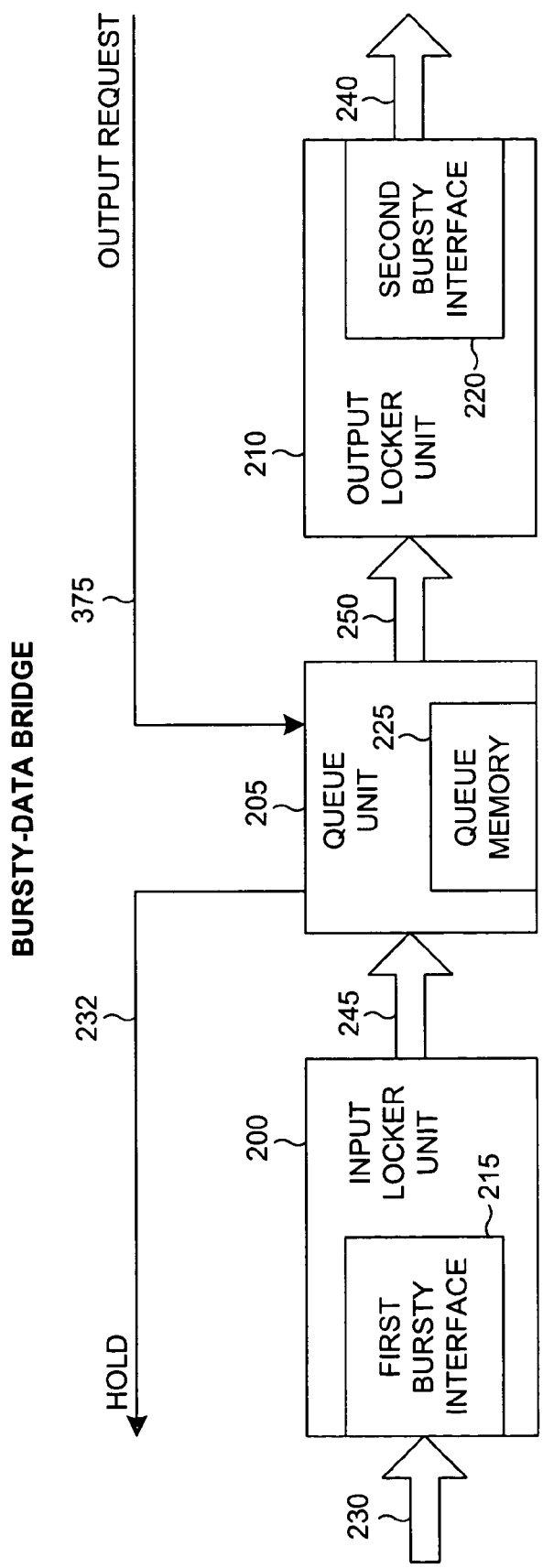
FIG. 7 is a block diagram of one example embodiment of an apparatus for forwarding bursty data.

FIG. 7 is a block diagram of one example embodiment of an apparatus for forwarding bursty data. According to this example embodiment, an apparatus for forwarding bursty data comprises an input locker unit 200, a queue unit 205 and output locker unit 210. According to one alternative embodiment, the input locker unit 200 includes a first bursty interface 215. According to yet another alternative embodiment, the output locker unit 210 includes a second bursty interface 220. According to one alternative embodiment, a bursty interface comprises a circuit that facilitates connection to an external network interface device. For example, a bursty interface included in either of the input locker unit 200 or the output locker unit 210 is used to interface with an SPI compliant network device that provides physical layer connectivity. According to yet another alternative embodiment, a bursty interface comprises a circuit that is capable of connecting directly to a data network. For example, a bursty interface according to this alternative embodiment comprises an SPI compliant network device that provides physical layer connectivity. It should be noted that any reference to an SPI compliant network device is presented herein for illustrative purposes only and is not intended to limit the scope of the claims appended hereto.

The input locker unit 200 uses the first bursty interface 215 as a means for receiving a complete burst of data. The complete burst of data is forwarded 245 from the input locker unit 200 to the queue unit 205. According to one in alternative embodiment, the queue unit 205 further comprises a queue memory 225 used to store the complete burst of data. The queue unit 205 organizes the queue memory 225 into one or more processing queues. The structure of a processing queue is more fully described infra. When an output port is capable of receiving a complete burst of data from a processing queue, the queue unit 205 directs 250 the complete burst of data to the output locker unit 210. The queue unit 205 receives an output request signal 375 from a bursty data interface. According to one example use case that is not intended to limit the scope of the claims appended hereto, when the present apparatus is utilized to dispatch a burst of data to an SPI compliant data interface, the output request signal 375 comprises a multistate signal that indicates if a destination device is "satisfied", "hungry" or "starving". The output locker unit makes the complete burst of data available 240 to a destination device using the second bursty interface 220.

By storing a complete burst of data in a processing queue, the present apparatus is capable of continuously receiving a complete burst of data using the first bursty interface 215 so long as a processing queue is capable of accepting an additional burst of data. In the event that a processing queue is not available to receive a complete burst of data, the queue unit 205 generates a hold signal 232. The hold signal 232 can be used to throttle the arrival of data bursts. For example, the hold signal 232 can be used as a hardware flow-control signal in an SPI compliant data interface. It should be noted that the hardware flow-control signal 232 generated by the queue unit 205 is used to control the arrival of data bursts. It is irrelevant what type of bursty data interface used to convey a data burst to the first bursty interface 215. Accordingly, the scope of the appended claims is not intended to be limited to any particular example of a bursty interface heretofore described.

Figure 8:
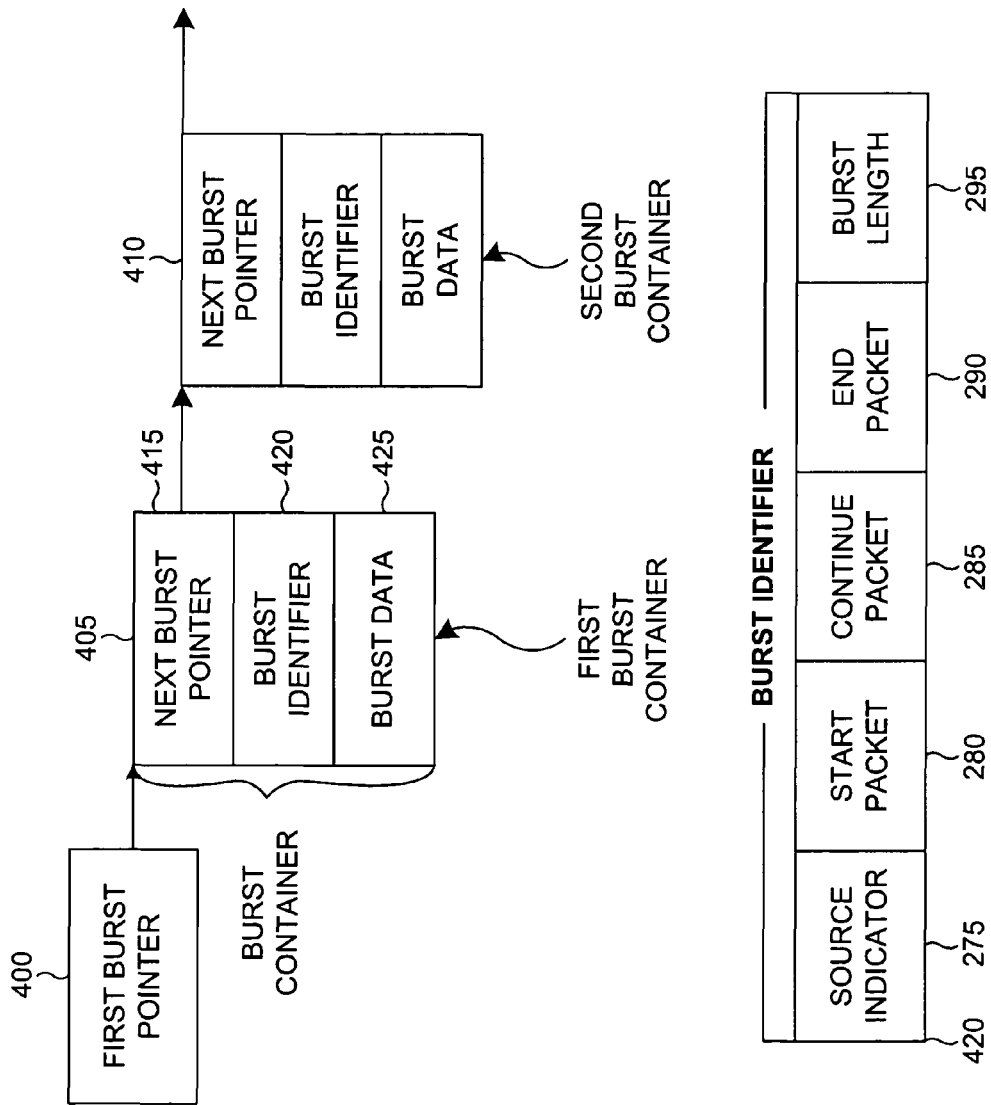
FIG. 8 is a pictorial illustration that depicts one example structure of a processing queue.

FIG. 8 is a pictorial illustration that depicts one example structure of a processing queue. According to one example embodiment of a queue unit 205, the queue unit 205 organizes a processing queue as a linked-list. According to this example embodiment, the queue unit 205 maintains a first burst pointer 400. The first burst pointer 400 is used to store the address of a burst container 405 that is used to store a first complete burst of data 425. According to this example embodiment, the queue unit 205 includes a next burst pointer 415 in a burst container 405 that it creates. The next burst pointer 415 is used to store a reference to a subsequent burst container 410 in a linked-list. According to yet another example embodiment, the queue unit 205 provides additional storage in the burst container for a burst identifier 420. The burst identifier 420 typically comprises a source indicator 275 for the burst of data received by the input locker unit 200 using the first bursty interface 215. The burst identifier 420, according to yet another example embodiment, further includes a burst length 295. According to yet another alternative embodiment, the queue unit 205 uses the burst identifier 420 to store data packet information. For example, and one illustrative embodiment, individual flags are provided for a start of packet 280, a continuation of a packet 285 and an end of a packet 290. These flags are used to indicate what portion of a data packet is included in the burst data 425 stored in the burst container 405.

Figure 9:
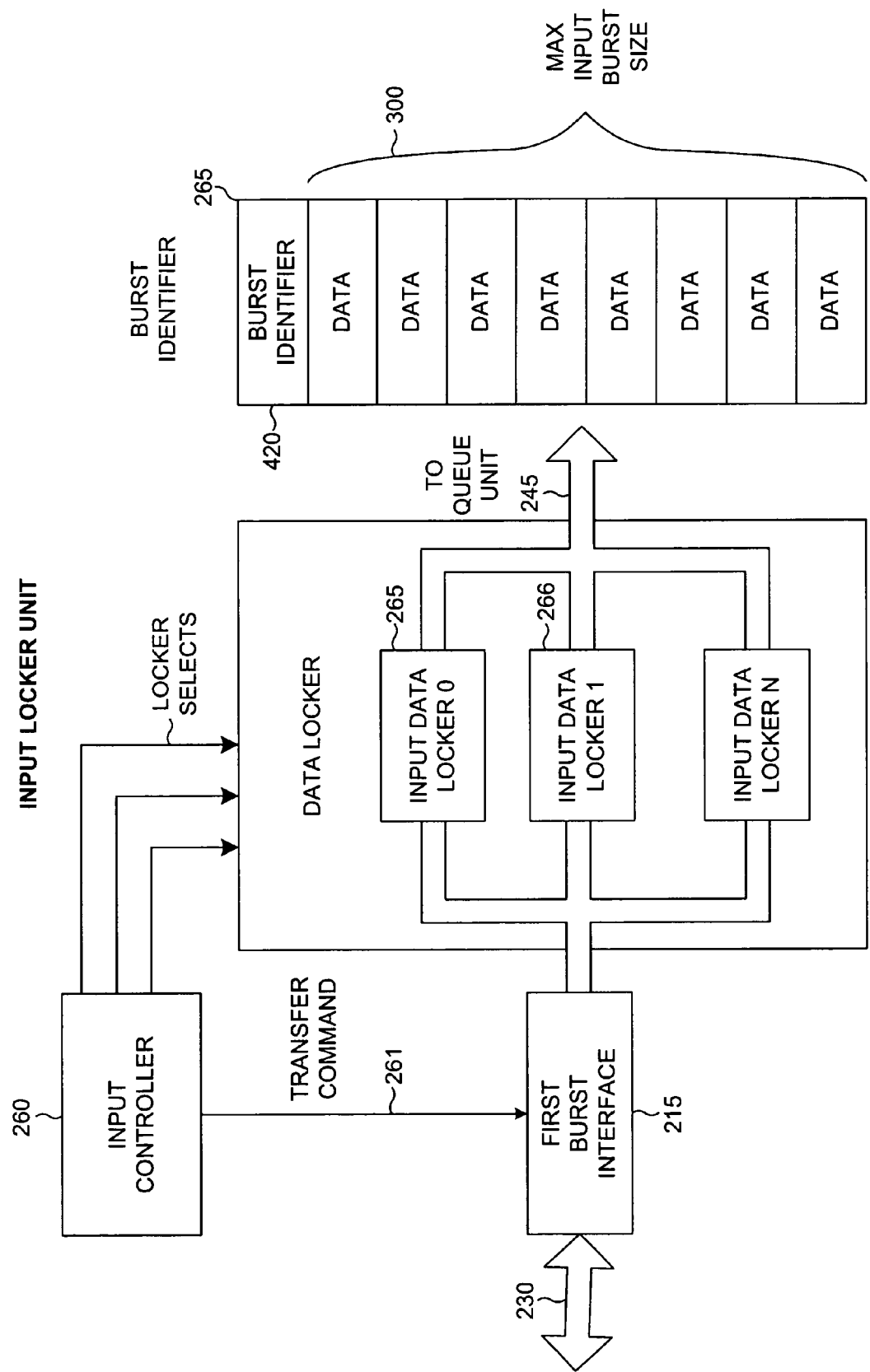
FIG. 9 is a block diagram of one illustrative embodiment of an input locker unit.

FIG. 9 is a block diagram of one illustrative embodiment of an input locker unit. According to this illustrative embodiment, an input locker unit 200 comprises a first bursty data interface 215. The structure of the bursty data interface 215 has already been described, supra. The input locker unit 200 further comprises a plurality of input lockers 265. Each input locker comprises storage for a complete burst of data. The amount of storage provided in each input locker 265 is dictated by a maximum input burst size 300 in accordance with the teachings of the present method. This illustrative embodiment of an input locker unit 200 further comprises an input controller 260.

According to this illustrative embodiment, the input controller 260 generates a transfer command signal 261 that causes a burst of data received by the first bursty data interface 215 to be directed to an available input locker 265. The input controller 260 manages the arrival of sequential complete data bursts by storing the sequential complete data bursts into one or more corresponding data lockers 265. According to one alternative embodiment, the input locker unit 200 provides data lockers 265 that further include storage for a burst identifier 420. The individual data lockers 265 can be accessed directly by the queue unit 205. The queue unit 205 retrieves a complete data burst 245 and an optional burst identifier 420 as will now be more fully described.

According to one illustrative use case, the present embodiment is applied when receiving packetized data transfers. In some cases, a complete data packet is contained in a single data burst received by the first bursty interface 215. In this case, the input controller 260 causes a complete data packet arriving at the first bursty interface 215 to be stored in a first input locker 265. In other cases, a data packet is larger than a data burst and must be spanned across two or more data bursts. When a data packet spans two or more data bursts, the input controller 260 stores a first portion of the data packet in a first input locker 265 and a further portion of the data packet in a second input locker 266.

Figure 10:
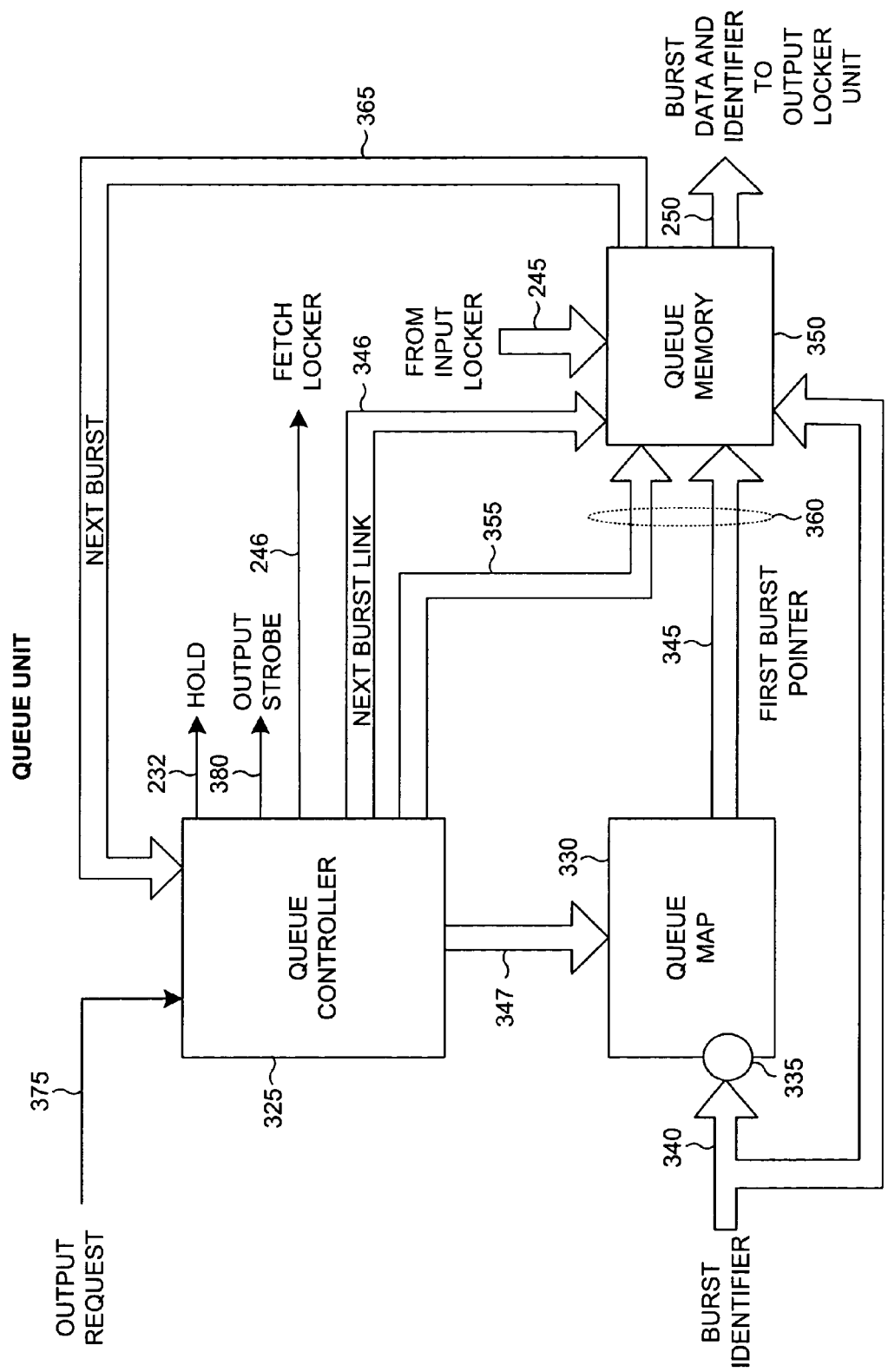
FIG. 10 is a block diagram that depicts the structure of one example embodiment of a queue unit.

FIG. 10 is a block diagram that depicts the structure of one example embodiment of a queue unit. According to this example embodiment, a queue unit 205 comprises a queue controller 325 and a queue map 330. According to one alternative embodiment, a queue unit 205 further comprises a queue memory 350. In operation, the queue unit 205 indicates when a processing queue maintained in the queue memory 350 can accommodate a complete burst of data. When a processing queue cannot accommodate a complete burst of data, the queue controller 325 generates a hold signal 232. The hold signal 232 can be used as a flow-control signal as previously discussed in the operational description provided along with FIG. 7. When a processing queue can accommodate a complete burst of data, the queue controller 325 generates a fetch-locker signal 246. The fetch-locker signal 246 is used to retrieve a complete data burst from one of the input lockers 265 included in the input locker unit 200. According to one alternative embodiment, a separate fetch-locker signal 246 is generated for each input locker 265 included in the input locker unit 200, i.e. the fetch-locker signal 246 includes an implicit selection of an input locker 265.

In response to the fetch-locker signal 246, a particular input locker 265 provides a complete burst of data 245 to the queue memory 350. A burst identifier 340 received from the input locker 265 is used to select a first burst pointer 345. When a new processing queue is required, the first burst pointer 345 is used to indicate the first burst container in a new linked-list of containers that collectively form a new processing queue. A new processing queue is required when the source indicator associated with a data burst is not yet associated with a first burst pointer stored in the queue map 330. The selected first burst pointer 345 forms part of an address 360 used to store burst data in the queue memory 350. Additional address bits (i.e. an offset) 355 are provided by the queue controller 325 as sequential elements of a burst of data 245 are stored in the queue memory 350. The burst identifier 340 is also stored in the queue memory 350 according to the address 360 that includes the first burst pointer 345 and an offset 355 provided by the queue controller 325. When a subsequent data burst is received, the queue controller 325 stores a next burst pointer 346 in the queue memory 350 as a link to a subsequent data burst container stored in the queue memory 350.

When retrieving a burst of data from the queue memory 350, a burst of data 250 is selected according to the first burst pointer 345 provided by the queue map 330 when the content of a first container in a queue is to be provided. When the queue memory 350 is providing a burst of data 250 from a first container in a queue, it also provides a link address 365 back to the queue controller 325. The queue controller 325 will then direct this link address 347 to the queue map 330. When the queue map 330 receives a valid link address 347, it uses the link address 347 to select a container of data stored in the queue memory 350. It should be noted that the queue memory 350 is then addressed using the signal lines that normally carry a first burst pointer (i.e. signal lines 345). In this case, these signal lines carry the link address 347 received by the queue map 350. In more simplistic terms, the queue map 330 supplants any first burst pointer it may have for a particular burst identifier 340 with a valid link address 347 that it may receive from the queue controller 325.

Figure 11:
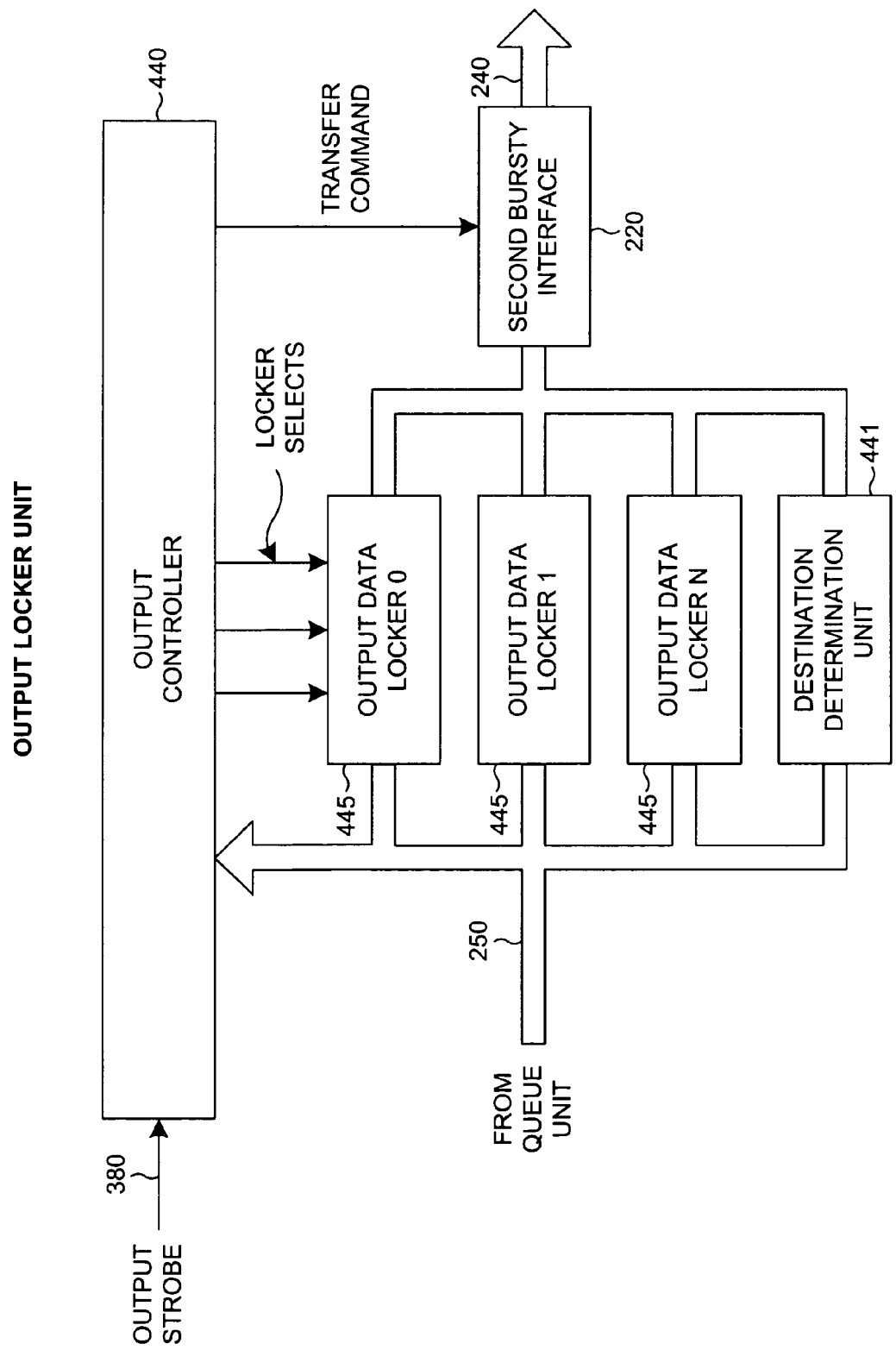
FIG. 11 is a block diagram that depicts one exemplary embodiment of an output locker unit.

FIG. 11 is a block diagram that depicts one exemplary embodiment of an output locker unit. According to this example embodiment, an output locker unit comprises a plurality of output lockers 445, a destination determination unit 441 and an output controller 440. Also included in this example embodiment is a second bursty interface 220. In operation, the output controller 440 responds to an output strobe 380 generated by the queue unit 205. In response to the output strobe 380, the output controller 440 generates a locker select signal. The output controller 440 is generally capable of generating a plurality of locker select signals each of which corresponds to an individual output data locker 445. It should be noted that only one of the locker select signals is active at any given time. It should also be noted that a locker select generated by the output controller 440 is used to enable a single output data locker from amongst a plurality of output data lockers 445. The enabled output data locker 445 receives a burst of data 250 from the queue unit 205.

As the output controller 440 operates, it recognizes portions of data packets included in a data burst. For example, the output controller 440 examines the burst identifier 420 included in a data burst 250 received from the queue unit 205. According to the burst identifier, the output controller 440 determines what portion of the data packet is included in a data burst. For example, one illustrative embodiment of a burst identifier includes a start packet flag 280, a continue packet flag 285 and an end packet flag 290 as originally discussed with reference to FIG. 8.

According to one alternative embodiment, the output controller 440 will store a complete data packet in a first output data locker 445 when the complete data packet is smaller equal to the maximum output burst size accommodated by the output locker unit 210. The size of a data burst can be determined according to a burst length indicator 295 included in a burst identifier 420. When a data packet is larger than the maximum burst sized, a first portion of a data packet is stored in a first output data locker 445 and a further portion of the data packet is stored in a second output data locker 445. It should be noted that the first portion of a data packet in this situation is included in a first data burst received from the queue unit 205. The further portion of the data packet in this situation is received in a second data burst received from the queue unit 205.

Generally, four different types of combinations of data packet information can be received from the queue unit 205. In one situation, a first data packet is included in a first data burst and a second data packet is included in a second data burst. In this situation, the first data packet included in the first data burst is stored in a first output data locker 445. In a different use scenario, a first data packet is included in a first data burst and a portion of a second data packet is included in the second data burst. Accordingly, the first data packet is stored in a first output data locker and the portion of the second data packet is stored in a second output data locker. In yet another example use case, a first data burst includes a portion of a first data packet and an entire second data packet is included in a second data burst. In this situation, the portion of the first data packet is stored in a first output data locker and the entire second data packet is stored in a second output data locker. In yet another situation, the output controller will detect the fact that a first data burst includes a portion of a first data packet and a second data burst includes a portion of a second data packet. In this operational situation, the portion of the first data packet is stored in a first output data locker and the portion of the second data packet is stored in a second output data locker.

The destination determination unit 441 operates to generate a destination indicator for each data burst received from the queue unit 205 and that is stored in one of the output data lockers 445 included in the output locker unit 210. According to one alternative embodiment, the destination determination unit 441 generates a destination indicator using as a basis at least one of a data packet, a first portion of a data packet and a further portion of a data packet received from the queue unit 205. According to yet another alternative embodiment, the destination determination unit 441 generates a first destination indicator based on at least one of a first data packet and a portion of a first data packet received from the queue unit 205. According to this alternative embodiment, the destination determination unit 441 generates a second destination indicator based on at least one of a second data packet and a portion of a second data packet received from the queue unit 205. One or more destination indicators generated by the destination determination unit 441 are directed to the second bursty interface 220 and are used by the second bursty interface to address a data burst once it is propagated 240 onto the second bursty interface medium.

Figure 12:
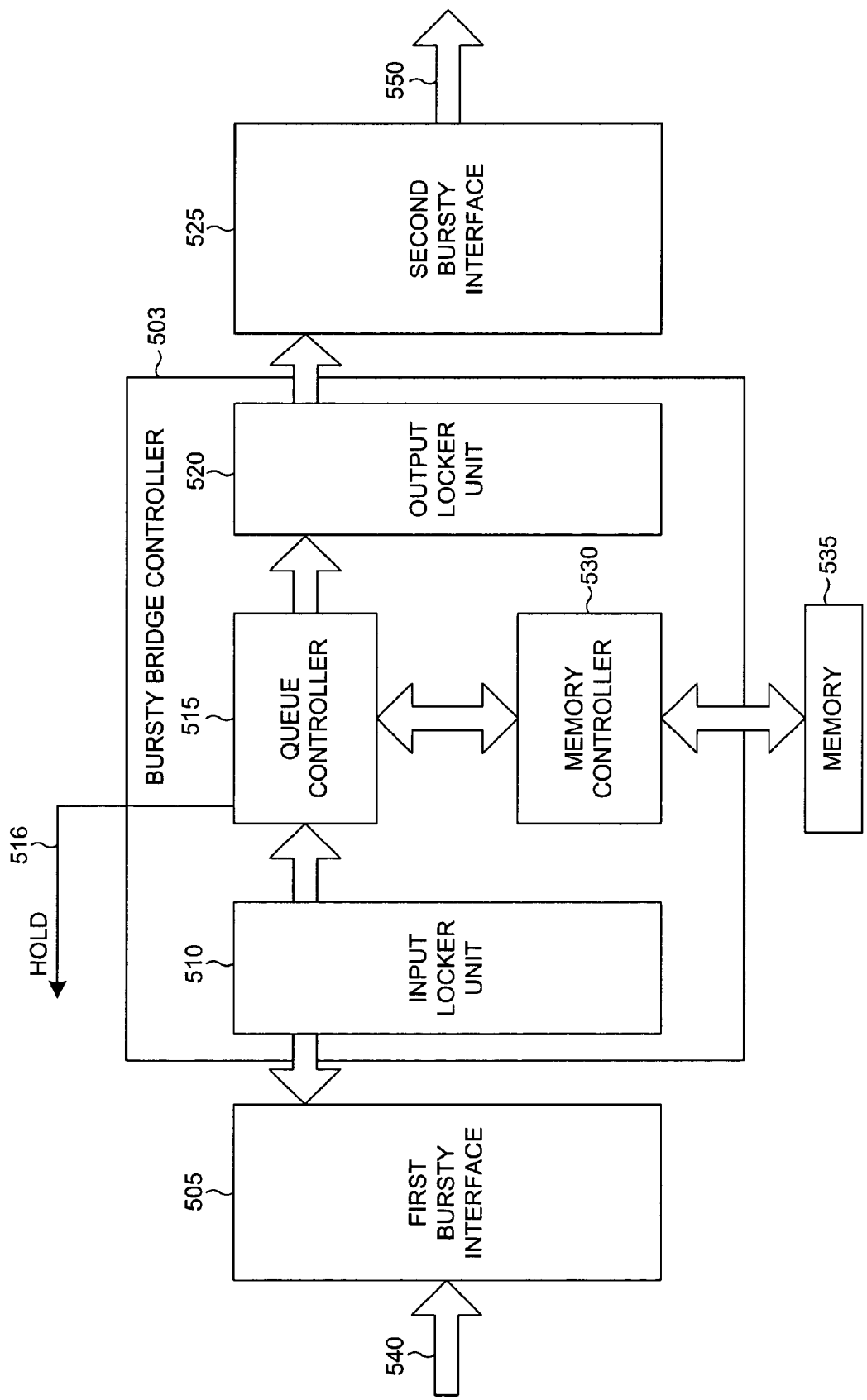
FIG. 12 is a block diagram that depicts one example embodiment of a bursty bridge controller.

FIG. 12 is a block diagram that depicts one example embodiment of a bursty bridge controller. According to this example embodiment, a bursty bridge controller 503 comprises an input locker unit 510, a queue controller 515 and output locker unit 520 and a memory controller 530. In this example embodiment, the input locker unit 510 includes one or more input data lockers, each capable of storing a complete burst of data received from a first bursty interface 505. The first bursty interface 505 is generally capable of receiving a data burst from a first bursty interface medium 540. The output locker unit 520 includes one or more output data lockers, each capable of receiving a complete burst of data from the queue controller 515. The output locker unit 520 directs the content of one or more output data lockers to a second bursty interface 525. The second bursty interface 525 is generally capable of propagating a burst of data to a second bursty interface medium 550. All of said operation of these elements is commensurate with the techniques and methods taught herein.

As the bursty bridge controller 503 operates, the queue controller 515 orchestrates the storage of a data burst stored in one of the one or more input data lockers included in the input locker unit 510 by directing the burst of data to the memory controller 530. The queue controller 515 creates a processing queue in a memory 535 attached to the bursty bridge controller 503 by means of the memory controller 530. The queue controller 515 of this example embodiment operates in a manner commensurate with the queue controller of other embodiments herein described. Accordingly, a first burst container is created in the memory 535 and the data burst stored in an input data locker is directed to this first burst container. Subsequent data bursts associated with a particular source indicator are stored in additional containers created in the memory 535 on an as-needed basis.

According to this alternative embodiment, the output locker unit 520 interacts with the queue controller 515 in order to retrieve a data burst stored in a burst container stored in the memory 535. This interaction is commensurate with the interaction of other embodiments of the output locker unit described herein. A burst of data is retrieved from the memory 535 (i.e. from a burst container stored in the memory 535) and directed to an output data locker included in the output data unit 520 from when it is directed to the second bursty interface 525. As already discussed, the second bursty interface 525 directs the data burst to the second bursty interface medium 550.

Figure 13:
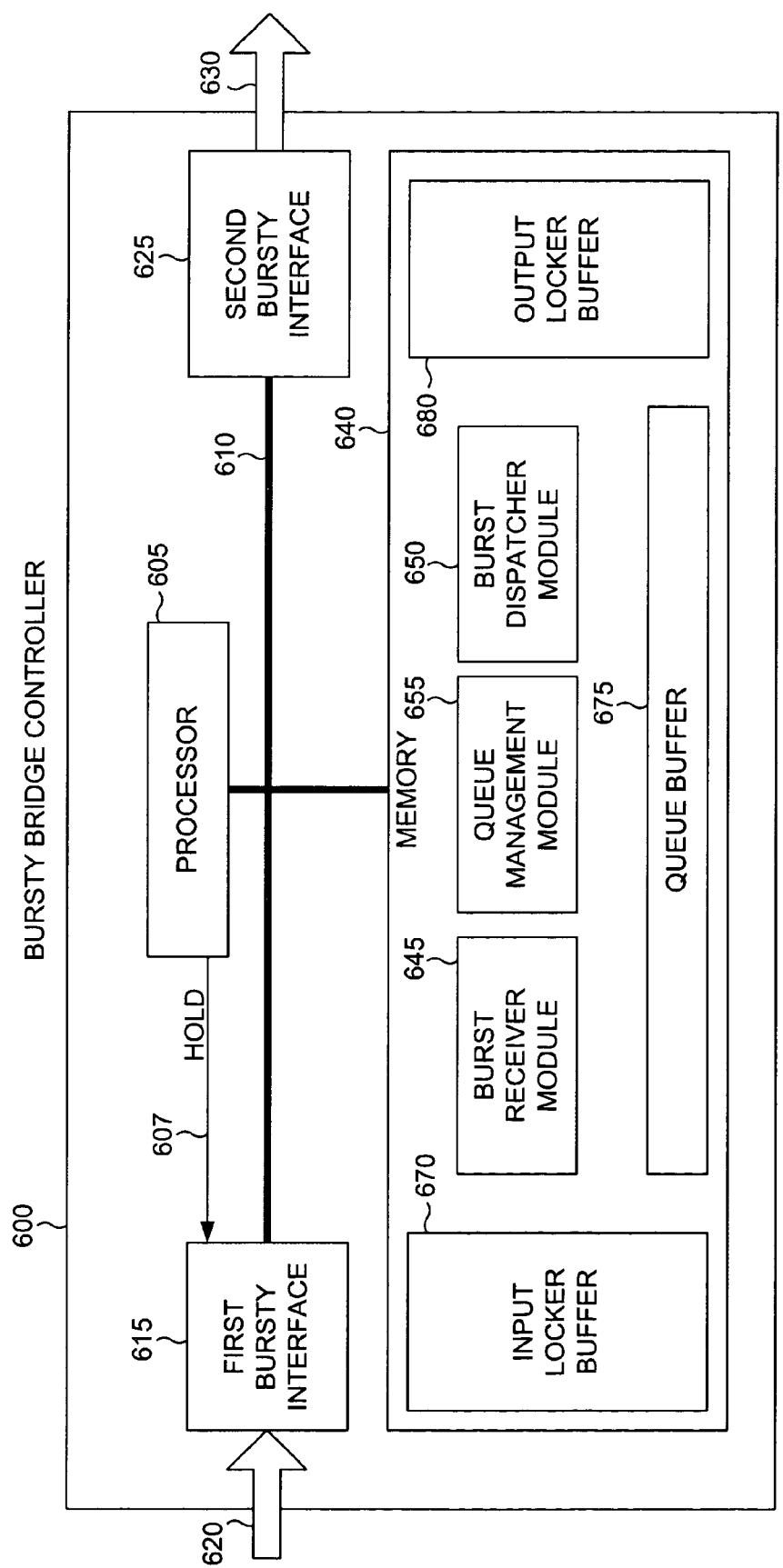
FIG. 13 is a block diagram of one alternative embodiment of an apparatus for forwarding bursty data.

FIG. 13 is a block diagram of one alternative embodiment of an apparatus for forwarding bursty data. According to this example embodiment, an apparatus 600 for forwarding bursty data comprises one or more processors 605, a first bursty interface 615, a second bursty interface 625 and a memory 640. These elements are communicatively coupled to each other by means of a bus 610. Also included in this example embodiment of the apparatus 600 are one or more functional modules. A functional module is typically embodied as an instruction sequence. An instruction sequence that implements a functional module, according to one alternative embodiment, is stored in the memory 640. The reader is advised that the term "minimally causes the processor" and variants thereof is intended to serve as an open-ended enumeration of functions performed by the processor 605 as it executes a particular functional module (i.e. instruction sequence). As such, an embodiment where a particular functional module causes the processor 605 to perform functions in addition to those defined in the appended claims is to be included in the scope of the claims appended hereto.

The functional modules (i.e. their corresponding instruction sequences) described herein that enable forwarding bursty data according to the present method are, according to one alternative embodiment, imparted onto computer readable medium. Examples of such medium include, but are not limited to, random access memory, read-only memory (ROM), compact disk ROM (CD ROM), floppy disks, hard disk drives, magnetic tape and digital versatile disks (DVD). Such computer readable medium, which alone or in combination can constitute a stand-alone product, can be used to convert a general-purpose computing platform into a device capable of forwarding bursty data according to the techniques and teachings presented herein. Accordingly, the claims appended hereto are to include such computer readable medium imparted with such instruction sequences that enable execution of the present method and all of the teachings herein described.

Stored in the memory 640 of this example embodiment are functional modules including a burst receiver module 645, a queue management module 655 and a burst dispatch module 650. In operation, the memory 640 is apportioned to provide an input locker buffer 670, a queue buffer 675 and at output locker buffer 680. It should be noted that the processor 605, at least according to one alternative embodiment, is capable of issuing a hold signal 607 to the first bursty interface 615. The hold signal 607 operates commensurate with teachings heretofore provided.

Figure 14:
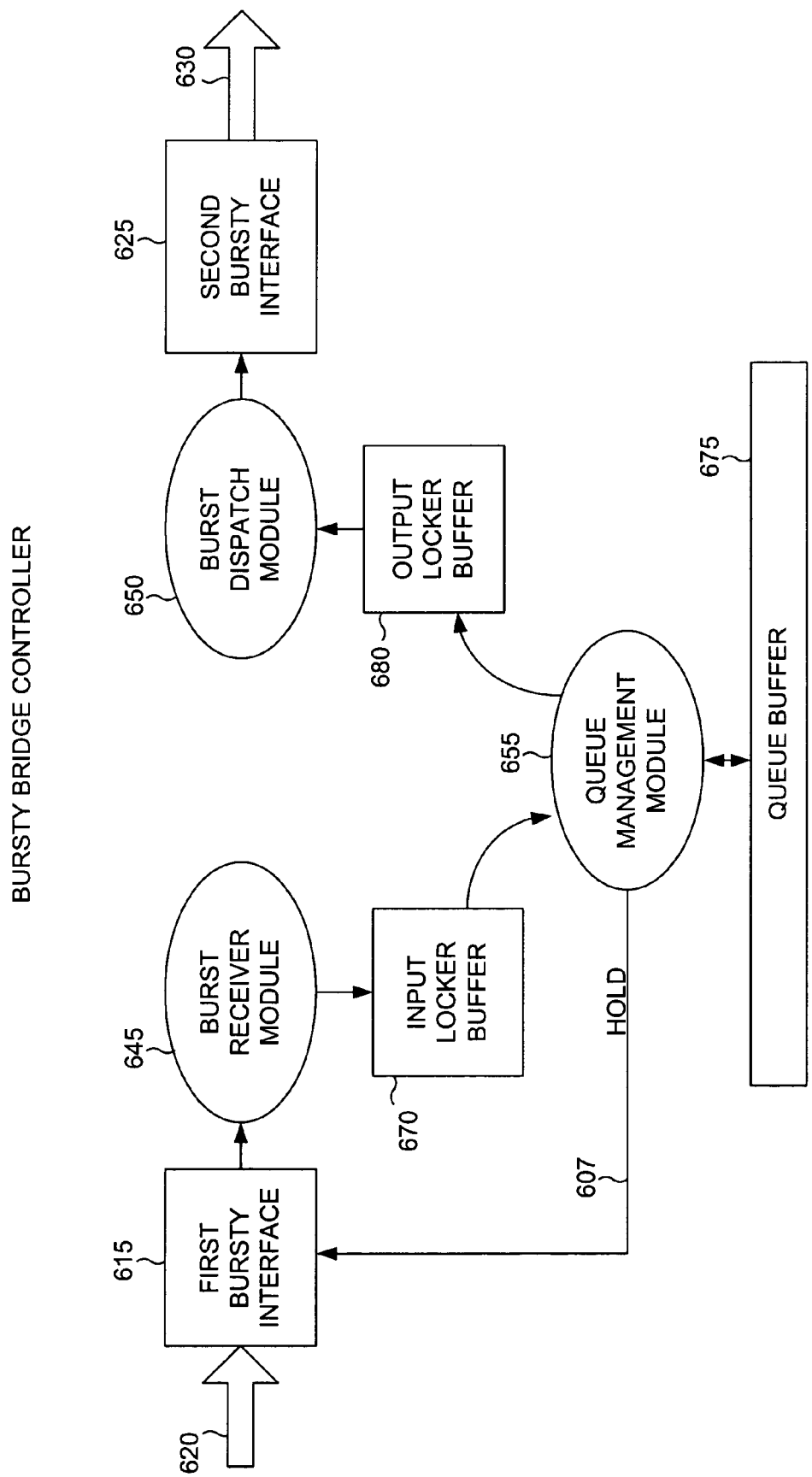
FIG. 14 is a data flow diagram that depicts the internal operation of one alternative embodiment of an apparatus for forwarding bursty data.

FIG. 14 is a data flow diagram that depicts the internal operation of one alternative embodiment of an apparatus for forwarding bursty data. According to this example embodiment, the first bursty interface 615 receives a data burst 620. When executed by the processor 605, the burst receiver module 645 minimally causes the processor 605 to retrieve a complete burst of data from the first bursty interface 615. The burst receiver module 645 further minimally causes the processor 605 to store the complete burst of data in a portion of the memory 640 known as the input locker buffer 670. One feature of the present apparatus is that the burst receiver module 645, according to one illustrative alternative embodiment, comprises a quick-execute module (e.g. embodied as an interrupt service routine). As such, the burst receiver module 645 causes the processor 605 to perform a simplistic transfer of a complete data burst from the first bursty interface 615 into the memory 640.

According to one alternative embodiment, the burst receiver module 645 causes the processor to move a complete burst of data from the first bursty interface 615 into the input locker buffer 670 by first minimally causing the processor 605 to establish a maximum input burst size. According to one alternative embodiment, the maximum input burst size is established according to a maximum input burst size indicator. This indicator, according to yet another alternative embodiment, is received by the processor 605 from an external source. According to yet another alternative embodiment, the maximum input burst size indicator is retrieved by the processor 605 from the memory 640. Typically, the maximum input burst size indicator is stored in the memory 640 upon manufacture of the apparatus 600.

According to yet another alternative embodiment, the processor 605, as it continues to execute the burst receiver module 645, further stores a complete data packet in the input locker buffer 670 when the data packet is smaller or equal to the maximum input burst size. According to this alternative embodiment, the processor 605 further stores in the input locker buffer 670 a first portion of a data packet up to the maximum input burst size and also separately stores in the input locker buffer 670 a further portion of the data packet up to the maximum input burst size when the data packet is larger than the maximum input burst size.

According to yet another alternative embodiment, the processor 605 further stores in the input locker buffer 670 a source indicator for a data packet when the data packet is smaller or equal to the maximum input burst size. As the processor 605 continues to execute the burst receiver module 645 of this alternative embodiment, the processor 605 is further minimally caused to store in the input locker buffer 670 a source indicator for a portion of a data packet and also separately store in the input locker buffer 670 a source indicator for a further portion of the data packet when the data packet is larger than the maximum input burst size.

The processor 605 continues to operate by executing the queue management module 655. When executed by the processor 605, the queue management module 655 minimally causes the processor 605 to create a processing queue in a portion of the memory 640 known as the queue buffer 675. Typically, the processor 605 creates a processing queue when a source indicator associated with a received data packet does not have a corresponding processing queue. If a processing queue is associated with a received data packet, the processor 605, as it continues to execute the queue management module 655, is minimally caused to store the contents of the input locker buffer 670 in the associated processing queue maintained by the processor 605 in the queue buffer 675.

The queue management module 655 of yet another alternative illustrative embodiment, when executed by the processor 605, minimally causes the processor to migrate a complete burst of data from a processing queue maintained in the queue buffer 675 to a portion of the memory 640 known as the output locker buffer 680. According to one alternative example embodiment, the queue management module 655 causes the processor 605 to migrate a complete burst of data by minimally causing the processor to establish maximum output burst size. According to one alternative embodiment, the maximum output burst size is established by minimally causing the processor 605 to receive a maximum output burst size indicator. In yet another alternative embodiment, the maximum output burst size is stored in the memory 640 as a value, from whence it is retrieved by the processor 605.

In one alternative example embodiment, the queue management module 655, when executed by the processor 605, minimally causes the processor 605 to store in the output locker buffer 680 a data packet when the data packet is smaller or equal to the maximum output burst size. According to this alternative example embodiment, the queue management module 655 further minimally causes the processor 605 to store in the output locker buffer 680 a first portion of a data packet up to the maximum output burst size and further minimally causes the processor 605 to also store in the output locker buffer 680 a further portion of a data packet up to maximum output burst size when the data packet is larger than the maximum output burst size. The queue management module 655 of this alternative example embodiment, when executed by the processor 605, further minimally causes the processor 605 to determine a destination indicator for at least one of a stored data packet, a stored first portion of the data packet and a stored further portion of the data packet. The determined destination indicator is then stored in the output locker buffer 680 as the processor 605 continues to execute the queue management module 655.

According to yet another alternative embodiment, the queue management module 655, when executed by the processor 605, causes the processor 605 to determine a destination indicator by minimally causing the processor 605 to determine a destination indicator using a translation map. Accordingly, a source indicator for a particular data packet is used by the processor 605 to select a destination indicator from the translation map. In yet another alternative embodiment, the queue management module 655, when executed by the processor 605, causes the processor 605 to determine a destination indicator by minimally causing the processor 605 to extract a header portion from a data packet stored in the input locker buffer 670. A destination indicator is then generated by the processor 605 according to the extracted header portion as the processor 605 continues to execute the queue management module 655.

In yet another alternative embodiment, the queue management module 655 causes the processor to migrate a complete burst of data from a processing queue stored in the queue buffer 675 by minimally causing the processor 605 to establish a maximum output burst size. According to one alternative embodiment, the processor 605 establishes a maximum output burst size according to a maximum output burst size indicator. The indicator, according to yet another alternative embodiment, is retrieved by the processor 605 from the memory 640 where it is stored as a variable value. In yet another alternative embodiment, the processor 605, as it continues to execute the queue management module 655, receives a maximum output burst size indicator from a source external to an apparatus for forwarding bursty data 600.

The queue management module 655, according to one example alternative embodiment, when executed by the processor 605, minimally causes the processor 605 to establish a maximum output burst size. According to yet another alternative embodiment, the queue management module 655 further minimally causes the processor 605 to store in the output locker buffer 680 according to the maximum output burst size a first data packet and a second data packet. In yet another alternative embodiment, the queue management module 655 further minimally causes the processor 605 to store in the output locker buffer 680 according to the maximum output burst size a first data packet and a portion of a second data packet. In yet another alternative embodiment, the queue management module 655 further minimally causes the processor 605 to store in the output locker buffer 680 according to the maximum output burst size a portion of a first data packet and a second data packet. In yet another alternative embodiment, the queue management module 655 further minimally causes the processor 605 to store in the output locker buffer 680 according to the maximum output burst size a portion of a first data packet and a portion of a second data packet. In each of these alternative embodiments, the processor, as it executes the queue management module 655, retrieves a data packet or a portion of a data packet from one or more processing queues stored in the queue buffer 675 maintained in the memory 640.

As the processor 605 continues to execute this alternative embodiment of a queue management module 655, it determines a first destination indicator for at least one a first data packet and a portion of a first data packet and a second destination indicator for at least one of a second data packet and a portion of a second data packet and then stores in the output locker buffer 680 the first and second destination indicators.

While the present method and apparatus has been described in terms of several alternative exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for forwarding bursty data comprising:
   receiving a complete burst of data by an input locker unit comprising a first bursty interface and data lockers for storing input burst data;
   directing the complete burst of data to at least one of a plurality of processing queues;
   storing the complete burst of data in said at least one of the processing queues, wherein said at least one of the processing queues is for continuously receiving complete bursts of data using the first bursty interface so long as the processing queue is for accepting an additional burst of data, and in the event that the processing queue is not available to receive the complete burst of data then a queue unit generates a hold signal and the hold signal is used to throttle the arrival of data bursts; and
   directing the complete burst of data from the at least one processing queue to an output port when the output port is able to accept data for a particular logical port, wherein the output port comprises an output locker unit comprising a second bursty interface and data lockers for storing the directed data burst.

2. The method of claim 1 further comprising generating a fill indication when a processing queue can not accommodate a data burst.

3. The method of claim 1 wherein receiving a complete burst of data comprises:
   specifying a maximum input burst size;
   storing a complete data packet when the data packet is smaller or equal to the maximum input burst size; and
   storing a first portion of a data packet up to the maximum input burst size and also separately storing a further portion of the data packet up to the maximum input burst size when the data packet is larger than the maximum input burst size.

4. The method of claim 3 further comprising:
   storing a source indicator for a data packet when the data packet is smaller or equal to the maximum input burst size; and
   storing a source indicator for a portion of a data packet and also separately storing the source indicator for a further portion of the data packet when the data packet is larger than the maximum input burst size.

5. The method of claim 3 further comprising requesting a processing queue when a source indicator associated with a received data packet does not have a corresponding processing queue.

6. The method of claim 1 wherein directing the complete burst of data from the processing queue to an output port comprises:
   specifying a maximum output burst size;
   storing a data packet received from the output queue when the data packet is smaller or equal to the maximum output burst size;
   storing a first portion of a data packet received from the output queue up to the maximum output burst size and also separately storing a further portion of a data packet received from the output queue up to the maximum output burst size when the data packet is larger than the maximum output burst size;
   determining a destination indicator for at least one of a stored data packet, a stored first portion of a data packet and a stored further portion of a data packet; and
   storing the determined destination indicator.

7. The method of claim 6 wherein determining a destination indicator comprises at least one of translating a source indicator to a destination indicator using a translation map and extracting a header portion from a data packet and generating a destination indicator according to the extracted header portion.

8. The method of claim 1 wherein directing the complete burst of data from the processing queue to an output port comprises:
   specifying a maximum output burst size;
   collectively storing at least one of a first data packet and a second data packet; a first data packet and a portion of a second data packet; a portion of a first data packet and a second data packet; and a portion of a first data packet and a portion of a second data packet received from one or more output queues according to the maximum output burst size;

determining a first destination indicator for at least one a first data packet and a portion of a first data packet and a second destination indicator for at least one of a second data packet and a portion of a second data packet; and storing the first and second destination indicators.

9. A method for forwarding bursty data comprising:

receiving a complete burst of data by an integrated circuit comprising a first bursty interface and data lockers for storing input burst data;

directing the complete burst of data to at least one of a plurality of processing queues in the integrated circuit;

storing the complete burst of data in said at least one of the processing queues, wherein said at least one of the processing queues is for continuously receiving complete bursts of data using the first bursty interface so long as the processing queue is for accepting an additional burst of data, and in the event that the processing queue is not available to receive the complete burst of data then a queue unit generates a hold signal and the hold signal is used to throttle the arrival of data bursts; and directing the complete burst of data from the at least one processing queue included in the integrated circuit to an output port included in the integrated circuit when the output port is able to accept data for a particular logical port, wherein the output port comprises an output locker unit comprising a second bursty interface and data lockers for storing the directed data burst.

10. The method of claim 9 further comprising generating a fill indication when a processing queue in the integrated circuit can not accommodate a data burst.

11. The method of claim 9 wherein receiving a complete burst of data comprises:

establishing a maximum input burst size according to a maximum input burst size indicator received in the integrated circuit;

storing a complete data packet in the integrated circuit when the data packet is smaller or equal to the maximum input burst size; and storing in the integrated circuit a first portion of a data packet up to the maximum input burst size and also separately storing in the integrated circuit a further portion of the data packet up to the maximum input burst size when the data packet is larger than the maximum input burst size.

12. The method of claim 11 further comprising:

establishing a maximum input burst size according to a maximum input burst size indicator received in the integrated circuit;

storing in the integrated circuit a source indicator for a data packet when the data packet is smaller or equal to the maximum input burst size; and storing in the integrated circuit a source indicator for a portion of a data packet and also separately storing in the integrated circuit the source indicator for a further portion of the data packet when the data packet is larger than the maximum input burst size.

13. The method of claim 11 further comprising requesting creation in the integrated circuit of a processing queue when a source indicator associated with a received data packet does not have a corresponding processing queue.

14. The method of claim 9 wherein directing the complete burst of data from the processing queue to an output port comprises:

establishing a maximum output burst size according to a maximum output burst size indicator received in the integrated circuit;

storing a data packet received from the output queue when the data packet is smaller or equal to the maximum output burst size;

storing in the integrated circuit a first portion of a data packet received from the output queue up to the maximum output burst size and also separately storing in the integrated circuit a further portion of a data packet received from the output queue up to the maximum output burst size when the data packet is larger than the maximum output burst size;

determining in the integrated circuit a destination indicator for at least one of a stored data packet, a stored first portion of a data packet and a stored further portion of a data packet; and storing in the integrated circuit the determined destination indicator.

15. The method of claim 14 wherein determining a destination indicator comprises at least one of translating a source indicator to a destination indicator using a translation map included in the integrated circuit and extracting a header portion from a data packet and generating a destination indicator according to the extracted header portion.

16. The method of claim 9 wherein directing the complete burst of data from the processing queue to an output port comprises:

establishing a maximum output burst size according to a maximum output burst size indicator received in the integrated circuit;

collectively storing in the integrated circuit at least one of a first data packet and a second data packet; a first data packet and a portion of a second data packet; a portion of a first data packet and a second data packet; and a portion of a first data packet and a portion of a second data packet received from one or more output queues according to the maximum output burst size;

determining in the integrated circuit a first destination indicator for at least one a first data packet and a portion of a first data packet and a second destination indicator for at least one of a second data packet and a portion of a second data packet; and storing in the integrated circuit the first and second destination indicators.

17. An apparatus for forwarding bursty data comprising:

input locker unit for receiving a complete burst of data comprising a first bursty interface and data lockers for storing input burst data;

queue unit for storing a complete burst of data from the input locker unit in at least one of a plurality of processing queues, the processing queue is for continuously receiving complete bursts of data using the first bursty interface so long as the processing queue is for accepting an additional burst of data, and in the event that the processing queue is not available to receive the additional burst of data then a queue unit generates a hold signal and the hold signal is used to throttle the arrival of data bursts; and output locker unit for making available at a second bursty interface a complete burst of data received from a processing queue.

18. The apparatus of claim 17 wherein the queue unit is for generating a hold indicator when a processing queue can not accept a burst of data.

19. The apparatus of claim 17 wherein the input locker unit comprises:
first bursty data interface;
plurality of input lockers each of which is for storing data up to a maximum input burst size; and
input controller that causes a complete data packet arriving at the first bursty interface to be stored in a first input locker when the entire data packet can be stored in one input locker and otherwise causes a first portion of a data packet to be stored in a first input locker and a further portion of the data packet to be stored in a second input locker.

20. The apparatus of claim 19 wherein each input locker is further for storing a burst identifier and wherein the input controller that causes a source indicator to be stored with an associated data packet.

21. The apparatus of claim 19 wherein the queue unit is for creating a new processing queue when a source indicator associated with a receive data packet does not have an associated processing queue.

22. The apparatus of claim 17 wherein the output locker unit comprises:
plurality of output lockers each for storing data up to a maximum output burst size;
second bursty interface;
destination determination unit for generating a destination indicator according to at least one of a data packet, a first portion of a data packet and a further portion of a data packet arriving at the output locker unit; and
output controller for:
storing a complete data packet received from a processing queue in a first output locker when the complete data packet is smaller or equal to the maximum output burst size and otherwise storing a first portion of a data packet in a first output locker and storing a further portion of the data packet in a second output locker and wherein the output controller is further for
directing data stored in one of the output lockers to the second bursty interface.

23. The apparatus of claim 22 wherein the destination determination unit comprises at least one of a translation map for providing a destination indicator according to a source indicator received with a data packet and a data packet header extraction unit for extracting a destination indicator from a packet header included in a received data packet.

24. The apparatus of claim 17 wherein the output locker unit comprises:
plurality of output lockers each for storing data up to a maximum output burst size;
output interface comprising at least one of a burst interface of a first type and a burst interface of a second type;
destination determination unit for generating a first destination indicator for at least one a first data packet and a portion of first data packet arriving at the output locker unit and a second destination indicator for at least one of a second data packet and a portion of second data packet arriving at the output locker unit; and
output controller for:
storing in an output locker at least one of a first data packet and a second data packet; a first data packet and a portion of a second data packet; a portion of a first data packet and a second data packet; and a portion of a first data packet and a portion of a second data packet received from one or more output queues according to the maximum output burst size and wherein the output controller is further capable (for directing data stored in one of the output lockers to the output interface.

25. A bursty bridge control unit comprising:
input locker unit for storing a complete burst of data received from a first bursty interface;
queue controller for storing a complete burst stored in the input locker unit in a processing queue and further for creating and managing a processing queue stored in a computer readable medium, the processing queue is for continuously receiving complete bursts of data using the first bursty interface so long as the processing queue is for accepting an additional burst of data, and in the event that the processing queue is not available to receive the additional burst of data then a queue unit generates a hold signal and the hold signal is used to throttle the arrival of data bursts;
output locker unit for storing a complete burst of data received from a processing queue managed by the queue controller and further for making the complete burst of data available to a second bursty interface; and
memory controller for directing the storage of data in a memory according to directives received from the queue controller.

26. The bursty bridge control unit of claim 25 wherein the input locker unit comprises:
plurality of input lockers each capable for storing a burst of data up to a maximum input burst size; and
input controller capable for storing a complete data packet received the first bursty interface when the data packet is smaller or equal to the maximum input burst size and otherwise storing a first portion of a data packet in a first input locker and a further portion of the data packet in a second input locker.

27. The bursty bridge control unit of claim 26 wherein the plurality of input lockers are further for storing a burst indicator and wherein the input controller causes a burst indicator to be stored in an input locker that is used to store an associated data burst.

28. The bursty bridge control unit of claim 25 wherein the queue controller is further for generating a hold signal when a processing queue can not accommodate a burst of data.

29. The bursty bridge control unit of claim 26 wherein the output locker unit comprises:
plurality of output lockers each for storing data up to a maximum output burst size;
destination determination unit for generating a destination indicator according to at least one of a data packet, a first portion of a data packet and a further portion of a data packet arriving at the output locker unit; and
output controller for:
storing a complete data packet received from a processing queue in a first output locker when the complete data packet is smaller or equal to the maximum output burst size and otherwise storing a first portion of a data packet in a first output locker and storing a further portion of the data packet in a second output locker and wherein the output controller is further for
directing data stored in one of the output lockers and a generated destination indicator to a second bursty interface.

30. An apparatus for forwarding bursty data comprising:
processor for executing instructions;
first bursty interface for receiving bursty data from a source;
second bursty interface for conveying bursty data to a destination;

memory; and instruction sequences stored in the memory including:

burst receiver instruction sequence that, when executed by the processor, minimally causes the processor to store into an input locker buffer portion of the memory a complete burst of data received by the first bursty interface;

queue management instruction sequence that, when executed by the processor, minimally causes the processor to store the contents of the input locker buffer portion of the memory in a processing queue maintained in a queue buffer portion of the memory and further minimally causes the processor to migrate a complete burst of data from the processing queue to an output locker portion of the memory, wherein the processing queue is for continuously receiving complete bursts of data using the first bursty interface so long as the processing queue is for accepting an additional burst of data, and in the event that the processing queue is not available to receive the additional burst of data then a queue unit generates a hold signal and the hold signal is used to throttle the arrival of data bursts; and burst dispatch module that, when executed by the processor, minimally causes the processor to direct the contents of the output locker portion of the memory to the second bursty interface.

31. The apparatus of claim 30 wherein the queue management unit further minimally causes the processor to generate a hold signal to the first burst interface when there is not enough memory available to enable a processing queue to accommodate a complete data burst.

32. The apparatus of claim 30 wherein the burst receiver instruction sequence causes the processor to receive a complete burst of data by minimally causing the processor to:

establish a maximum input burst size according to a maximum input burst size indicator;

store a complete data packet in an input locker portion of the memory when the data packet is smaller or equal to the maximum input burst size; and store in the input locker portion of the memory a first portion of a data packet up to the maximum burst size and also separately store in the input locker portion of the memory a further portion of the data packet up to the maximum input burst size when the data packet is larger than the maximum input burst size.

33. The apparatus of claim 32 wherein the burst receiver instruction sequence further minimally causes the processor to:

store in the input locker portion of the memory a source indicator for a data packet when the data packet is smaller or equal to the maximum input burst size; and store in the input locker portion of the memory a source indicator for a portion of a data packet and also separately store in the input locker portion of the memory the source indicator for a further portion of the data packet when the data packet is larger than the maximum input burst size.

34. The apparatus of claim 32 wherein the queue management module further minimally causes the processor to create a processing queue in a queue buffer portion of the memory when a source indicator associated with a received data packet does not have a corresponding processing queue.

35. The apparatus of claim 32 wherein the queue management instruction sequence causes the processor to migrate a complete burst of data from the processing queue to an output locker portion of the memory by minimally causing the processor to:

establish a maximum output burst size according to a maximum output burst size indicator;

store in an output locker portion of the memory a data packet received from the processing queue when the data packet is smaller or equal to the maximum output burst size;

store in the output locker portion of the memory a first portion of a data packet received from the output queue up to the maximum output burst size and also separately storing in the output locker portion of the memory a further portion of a data packet received from the output queue up to the maximum output burst size when the data packet is larger than the maximum output burst size;

determine a destination indicator for at least one of a stored data packet, a stored first portion of a data packet and a stored further portion of a data packet; and store in the output locker portion of the memory the determined destination indicator.

36. The apparatus of claim 32 wherein the queue management instruction sequence causes the processor to determine a destination indicator by minimally causing the processor to determine a destination indicator by translating a source indicator to a destination indicator using a translation map.

37. The apparatus of claim 32 wherein the queue management instruction sequence causes the processor to determine a destination indicator by minimally causing the processor to determine a destination indicator by extracting a header portion from a data packet and generating a destination indicator according to the extracted header portion.

38. The apparatus of claim 32 wherein the queue management instruction sequence causes the processor to migrate a complete burst of data from the processing queue to an output locker portion of the memory by minimally causing the processor to:

establish a maximum output burst size according to a maximum output burst size indicator;

collectively store in an output locker portion of the memory at least one of a first data packet and a second data packet; a first data packet and a portion of a second data packet; a portion of a first data packet and a second data packet; and a portion of a first data packet and a portion of a second data packet received from one or more processing queues according to the maximum output burst size;

determine a first destination indicator for at least one a first data packet and a portion of a first data packet and a second destination indicator for at least one of a second data packet and a portion of a second data packet; and store in an output locker portion of the memory the first and second destination indicators.

* * * * *